United States Patent
Wolf et al.

(10) Patent No.: US 8,584,778 B2
(45) Date of Patent: Nov. 19, 2013

(54) REAR SPOILER WITH A COOLING DEVICE FOR A MOTOR VEHICLE

(71) Applicant: Dr. Ing. h.c.F. Porsche Aktiengesellschaft, Stuttgart (DE)

(72) Inventors: Thomas Wolf, Riedstadt (DE); Timo Lemke, Stuttgart (DE); Joachim Paul, Stuttgart (DE); Maarten Brink, Neckartenzlingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 13/624,086

(22) Filed: Sep. 21, 2012

(65) Prior Publication Data
US 2013/0068547 A1    Mar. 21, 2013

(30) Foreign Application Priority Data
Sep. 21, 2011  (DE) .......................... 10 2011 053 831

(51) Int. Cl.
*B60K 11/00* (2006.01)
*B60K 11/04* (2006.01)

(52) U.S. Cl.
USPC .................... 180/68.1; 180/68.4; 180/68.6

(58) Field of Classification Search
USPC .............. 180/68.1, 68.3, 68.4, 68.6; 296/180.1–180.3, 180.5, 190.09
See application file for complete search history.

(56) References Cited

U.S. PATENT DOCUMENTS

| | | | | |
|---|---|---|---|---|
| 4,825,815 A | * | 5/1989 | Turner | 123/41.49 |
| 4,889,382 A | * | 12/1989 | Burst et al. | 296/180.5 |
| 5,923,245 A | * | 7/1999 | Klatt et al. | 340/479 |
| 6,092,616 A | * | 7/2000 | Burris et al. | 180/68.1 |
| 6,170,904 B1 | * | 1/2001 | Schaedlich et al. | 296/180.1 |
| 6,505,696 B1 | * | 1/2003 | Prevost | 180/68.4 |
| 7,201,432 B2 | * | 4/2007 | Roth | 296/180.5 |
| 7,387,330 B2 | * | 6/2008 | Froeschle et al. | 296/180.5 |
| 7,399,026 B2 | * | 7/2008 | Froeschle et al. | 296/180.5 |
| 7,578,543 B2 | * | 8/2009 | Wegener et al. | 296/180.5 |
| 7,753,152 B2 | * | 7/2010 | Nakae et al. | 180/68.1 |
| 7,922,234 B2 | * | 4/2011 | Froschle et al. | 296/180.1 |
| 8,113,571 B2 | * | 2/2012 | Goenueldinc | 296/180.5 |
| 8,215,703 B2 | * | 7/2012 | Goenueldinc | 296/180.1 |

FOREIGN PATENT DOCUMENTS

| | | |
|---|---|---|
| DE | 31 10 447 | 11/1982 |
| DE | 36 15 584 | 11/1987 |
| DE | 39 16 692 | 11/1990 |
| DE | 197 41 321 | 12/1998 |
| DE | 198 06 610 | 8/1999 |
| DE | 199 02 289 | 7/2000 |
| DE | 10 2008 057 420 | 12/2009 |
| FR | 2 034 190 | 12/1970 |

OTHER PUBLICATIONS

Search Report of Jun. 26, 2012 from German application.

* cited by examiner

*Primary Examiner* — J. Allen Shriver, II
*Assistant Examiner* — Travis Coolman
(74) *Attorney, Agent, or Firm* — Gerald E. Hespos; Michael J. Porco; Matthew T. Hespos

(57) ABSTRACT

A rear spoiler of a motor vehicle is coupled to a charge air cooler that is arranged vertically in the transverse direction of the vehicle. The rear spoiler together with the charge air cooler is adjustable into an inoperative and an operative position. The charge air cooler has an active position when the rear spoiler is in the operative position so that cooling air can flow through the charge air cooler.

8 Claims, 1 Drawing Sheet

REAR SPOILER WITH A COOLING DEVICE FOR A MOTOR VEHICLE

CROSS REFERENCE TO RELATED APPLICATION

This application claims priority under 35 USC 119 to German Patent Application No. 10 2011 053 831.3, filed on Sep. 21, 2011 the entire disclosure of which is incorporated herein by reference.

BACKGROUND OF THE INVENTION

1. Field of the Invention

The invention relates to a rear spoiler for a motor vehicle.

2. Description of the Related Art

DE 198 06 610 C2 discloses a motor vehicle with a spoiler fixedly arranged on an upper side of a rear region of the motor vehicle. Cooling air feeds for a charge air cooler are arranged horizontally below the spoiler.

It is the object of the invention to provide a rear spoiler with a cooling device for a motor vehicle so that the cooling device improves air supply to a charge air cooler in an aerodynamically advantageous manner when the rear spoiler is in an extended position.

SUMMARY OF THE INVENTION

The invention disposes a charge air cooler in a vehicle in a manner to obtain a high throughput of cooling air. More particularly, the charge air cooler is connected to the rear spoiler so that the charge air cooler is adjustable between an inoperative position and an operative extending position. The charge air cooler that is in the operative extending position is exposed from the vehicle body to below the rear spoiler. The charge air cooler preferably is arranged in the transverse direction of the vehicle and runs vertically so that cooling air can flow through the charge air cooler when the rear spoiler is in the extended operative position.

The charge air cooler preferably extends over virtually the entire width of the rear spoiler and is positioned so that cooling air can flow horizontally through the charge air cooler in the active position of the charge air cooler. The air flow is delimited on one side by an approximately horizontal lower surface of the rear spoiler and on the other side by the vehicle body located therebelow or by a vehicle body part having a horizontal surface. The charge air cooler is extendable together with the rear spoiler and has air passing horizontally therethrough to achieve advantageous effects of aerodynamics, cooling air throughput and heat protection.

The guiding of air to the charge air cooler does not require any air guides that are affected by pressure losses. Additionally, the charge air cooler in the extended state is acted upon frontally by ram air to obtain high cooling air throughputs. The horizontal flow through the charge air cooler results in a discharge of the cooling air parallel to the roadway and the exhaust air flow from the cooler in the rear region leads to an aerodynamically advantageous increase in pressure thereby reducing the air resistance. Furthermore, this arrangement is uplift-neutral and avoids an increase in the rear axial uplift that occurs, for example, when the cooling air is discharged downward.

Stamped formations may be formed in the rear lid so that a sufficient supply of cooling air to the charge air cooler is ensured in the retracted inoperative positions of the spoiler and the charge air cooler. Thus, the cooling air can be conducted to the charge air cooler concealed below the rear spoiler, via. In this case, the cooling air is conducted under the rear spoiler blade of the spoiler through to the charge air cooler.

The charge air cooler and the rear spoiler connected thereto can be arranged in lateral linear guides so as to be retractable vertically into the inoperative position and extendable vertically into the operative position. The guides are arranged on both sides of the rear spoiler blade and ensure that the charge air cooler is extendable exactly in the vertical position thereof and cooling air flows through horizontally.

The rear spoiler that is in the extended operative position may be pivotable about a transverse axis and hence can be positionable on the vehicle body counter to the direction of flow of the cooling air. For example, a rear edge of the rear spoiler blade can be tiltable downward.

An exemplary embodiment of the invention is illustrated in the drawings and is described in more detail below.

DETAILED DESCRIPTION OF THE PREFERRED EMBODIMENTS

Figure 1:
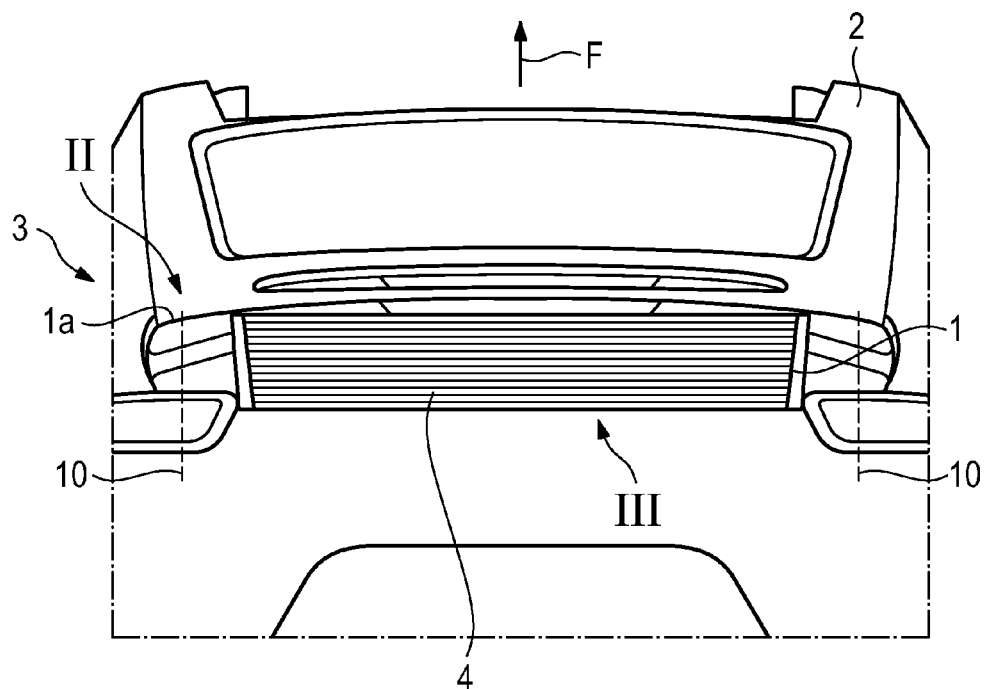
FIG. 1 is a view of a rear of a vehicle with a rear spoiler which is extended in an operative position and has a connected charge air cooler.
Figure 2:
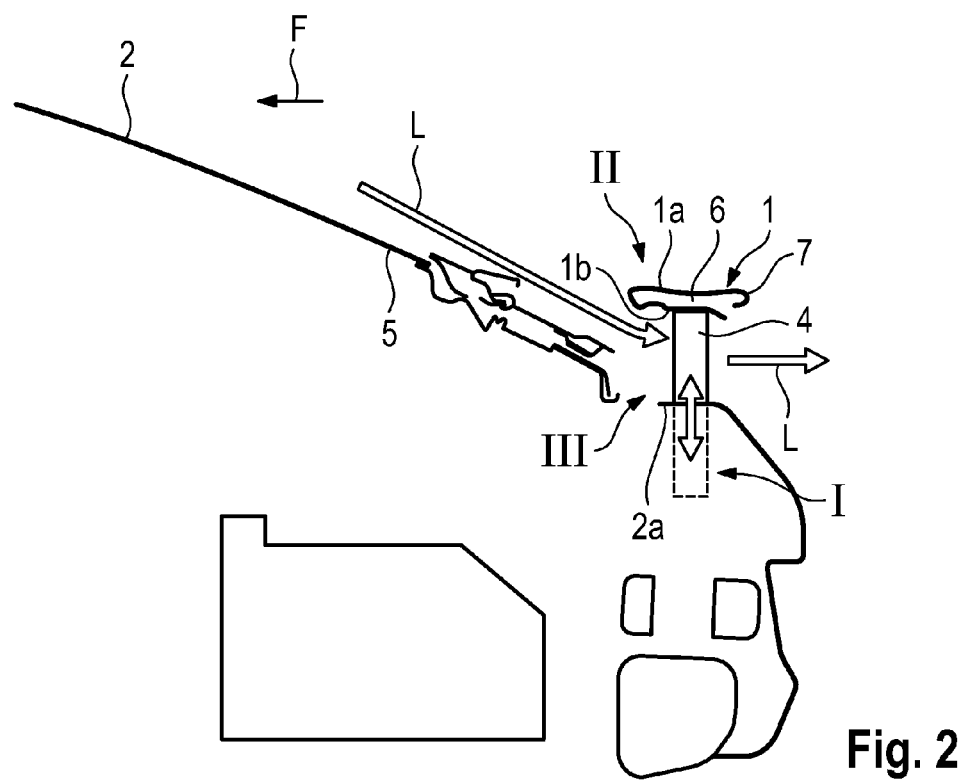
FIG. 2 is a vertical longitudinal section through the extended rear spoiler with the connected charge air cooler in an active position.

A spoiler 1 or an air guiding device for a vehicle is arranged on the rear 3 of a vehicle body 2 and is adjustable from a retracted inoperative position I in the vehicle body 2 into an extended operative position II, and vice versa. A charge air cooler 4 is connected to the spoiler 1 and is adjustable jointly with the spoiler 1 between the inoperative and operative positions I and II. The charge air cooler 4 is connected to the rear spoiler 1 and extends in an exposed manner from the vehicle body 2 to below the rear spoiler 1 when the rear spoiler 1 is in the operative position II.

The charge air cooler 4 preferably is aligned vertically and is arranged in the transverse direction of the vehicle and, in the extended operative position II of the rear spoiler 1, the charge air cooler 4 has an active position III through which cooling air L flows. The charge air cooler 4 extends virtually over the entire width of the rear spoiler 1 and, in the active position III, cooling air L flows through the cooler 4 and is directed through the charge air cooler 4 in the horizontal direction counter to the direction of travel F. The air flow L is delimited on the upper and lower sides by a lower substantially horizontal surface 1b of the spoiler blade 1a of the rear spoiler 1 and by an upper substantially horizontal surface 2a of the vehicle body 2.

The charge air cooler 4 is concealed in the rear 3 of the vehicle body 2 when the rear spoiler 1 is in the retracted inoperative position I. Stamped formations or the like in the rear lid 5 enable cooling air L to be conducted below a rear spoiler blade 1a of the spoiler 1 to the charge air cooler 4.

Guides 10 are arranged at the sides of the rear spoiler 1 so that the rear spoiler 1 can be adjusted vertically and linearly from the inoperative position I to the operative position II with the charge air cooler 4 taking up the active position III.

The rear spoiler 1 that is in the extended operative position II can be pivoted relative to the vehicle body 2 about a transverse axis 6 so that the rear edge 7 of the rear spoiler blade 1a can be tilted down and the rear spoiler 1 can take up an angled position to improve the aerodynamic action of the entire system.

What is claimed is:

1. A rear spoiler with a cooling device for a motor vehicle, the rear spoiler having a spoiler blade with a specified width in a transverse direction of the motor vehicle, the rear spoiler being adjustable between a retracted inoperative position in a vehicle body and an operative position extended from the vehicle body, the cooling device comprising a charge air cooler connected to the rear spoiler and being moveable with the rear spoiler between the inoperative and operative positions, the charge air cooler being arranged in a transverse direction of the vehicle and extending substantially vertically in an exposed manner from the vehicle body to a position below the rear spoiler blade when the rear spoiler is in the operative position to define an active position for the charge air cooler through which cooling air flows, the charge air cooler having a specified width in a transverse direction of the motor vehicle that does not exceed the specified width of the spoiler blade.

2. The rear spoiler of claim 1, wherein the charge air cooler extends over virtually an entire width of the rear spoiler and, in the active position, is positioned so that the cooling air can flow substantially horizontally through the charge air cooler between a substantially horizontal lower surface of the rear spoiler and a substantially horizontal surface of the vehicle body.

3. The rear spoiler of claim 1, wherein the charge air cooler is concealed in the rear part of the vehicle body when the rear spoiler is in the retracted inoperative position, and stamped formations are formed in a rear lid of the vehicle body to permit the cooling air to flow below the spoiler blade of the rear spoiler to the charge air cooler when the rear spoiler is in the retracted inoperative position.

4. A motor vehicle, comprising: a vehicle body; a rear spoiler that is adjustable between a retracted inoperative position in the vehicle body and an operative position extended from the vehicle body; and a charge air cooler connected to the rear spoiler and being moveable with the rear spoiler between the inoperative and operative positions, the charge air cooler being arranged in a transverse direction of the vehicle and extending substantially vertically in an exposed manner from the vehicle body to a position below the rear spoiler when the rear spoiler is in the operative position to define an active position for the charge air cooler through which cooling air flows, wherein the charge air cooler is concealed in the rear part of the vehicle body when the rear spoiler is in the retracted inoperative position, and stamped formations are formed in a rear lid of the vehicle body to permit the cooling air to flow below a rear spoiler blade of the spoiler to the charge air cooler when the rear spoiler is in the retracted inoperative position.

5. The motor vehicle of claim 4, wherein the charge air cooler extends over virtually an entire width of the rear spoiler and, in the active position, is positioned so that the cooling air can flow substantially horizontally through the charge air cooler between a substantially horizontal lower surface of the rear spoiler and a substantially horizontal surface of the vehicle body.

6. The motor vehicle of claim 5, wherein the vehicle body has lateral linear guides that guide the charge air cooler and the rear spoiler vertically between the inoperative position and the operative position.

7. A rear spoiler with a cooling device for a motor vehicle, the rear spoiler being adjustable between a retracted inoperative position in a vehicle body and an operative position extended from the vehicle body, the cooling device comprising a charge air cooler connected to the rear spoiler and being moveable with the rear spoiler between the inoperative and operative positions, the charge air cooler being arranged in a transverse direction of the vehicle and extending substantially vertically in an exposed manner from the vehicle body to a position below the rear spoiler when the rear spoiler is in the operative position to define an active position for the charge air cooler through which cooling air flows, wherein the charge air cooler and the connected rear spoiler are arranged in lateral linear guides so as to be retractable vertically into the inoperative position and extendable vertically into the operative position.

8. A rear spoiler with a cooling device for a motor vehicle, the rear spoiler being adjustable between a retracted inoperative position in a vehicle body and an operative position extended from the vehicle body, the cooling device comprising a charge air cooler connected to the rear spoiler and being moveable with the rear spoiler between the inoperative and operative positions, the charge air cooler being arranged in a transverse direction of the vehicle and extending substantially vertically in an exposed manner from the vehicle body to a position below the rear spoiler when the rear spoiler is in the operative position to define an active position for the charge air cooler through which cooling air flows, wherein the rear spoiler, in the extended operative position, is pivotable about a transverse axis so as to be positionable on the vehicle body counter to a direction of flow of the cooling air, and so that a rear edge of the rear spoiler blade is tiltable down.

* * * * *